United States Patent Office 3,068,274
Patented Dec. 11, 1962

3,068,274
(2-CYANO-3-AMINO)THIO-2-ALKENAMIDES
Marvin A. McCall, Kingsport, Tenn., assignor to Eastman Kodak Company, Rochester, N.Y., a corporation of New Jersey
No Drawing. Filed Aug. 18, 1960, Ser. No. 50,309
10 Claims. (Cl. 260—465.5)

This invention relates to (2-cyano-3-amino) thio-2-alkenamides having the following general structure:

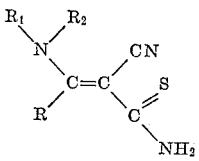

wherein R represents an alkyl group containing from 1–5 carbon atoms and $R_1$ and $R_2$ each represents an atom of hydrogen or an alkyl group containing from 1–5 carbon atoms, e.g. methyl, ethyl, propyl, isopropyl, butyl, sec. butyl, amyl, etc. groups. The above defined new class of compounds of the invention are in addition, to being effective rodent repellents, valuable intermediates in chemical synthesis.

It is, accordingly, an object of the invention to provide a new class of compounds containing active functional groups. Another object is to provide compositions that are particularly useful as rodent repellents. Another object is to provide a process for preparing the new compounds. Other objects will become apparent hereinafter.

In accordance with the invention, I prepare my new compounds by reacting a (2-cyano-3-alkoxy) thio-2-alkenamides under anhydrous conditions with a nitrogen base such as anhydrous ammonia, monoalkylamines or dialkylamines in accordance with the following general reaction equation:

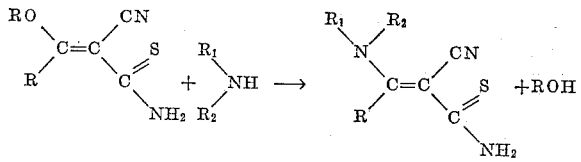

wherein R, $R_1$ and $R_2$ are as previously defined. The reaction may be carried out in an inert organic solvent such as ethyl ether, petroleum ether, hexane, benzene, toluene or other suitable solvent or mixed solvents. The reaction temperature may be varied over a wide range, for example, within 0°–150° C. range; however, the preferred operating range is from 0°–100° C. Advantageously, the reaction is carried out under normal atmospheric pressures, but if desired pressures below or above normal atmospheric can also be employed. Stoichiometric amounts of the starting alkenamide and the nitrogen base can be used, i.e. equimolar quantities of the two reactants, but the usual practice is to add an excess up to 2 moles or even more of the nitrogen base to each mole of the alkenamide starting material which is dispersed or suspended in the inert solvent medium. Where the nitrogen base is a gas under normal conditions, it is simply bubbled into the reaction mixture until the suspended alkenamide has gone completely into solution. Usually a slight or moderate excess of the stoichiometrically required amount is used. The product of the invention is then recovered from the reaction mixture by conventional means such as evaporation of the solvent and recrystallization from a solvent for the product, e.g. from methyl alcohol.

Suitable intermediate (2-cyano-3-alkoxy) thio-2-alkenamides include (2-cyano-3-methoxy) thiocrotonamide, (2-cyano-3-ethoxy) thiocrotonamide, (2 - cyano-3-methoxy) thio-2-pentenamide, (2-cyano-3-methoxy) thio-2-heptenamide, and the like coming within the general formula set forth in the reaction equation. They may be prepared as described in copending application of Marvin A. McCall and Newton H. Shearer, Jr., Serial No. 50,307, filed of even date herewith, by reacting an alkoxyalkyldene malonitrile [Diels et al., Ber., 55, p. 3441; Jones, J. Amer. Chem. Soc., 74, p. 4889 (1952)] with hydrogen sulfide. Suitable nitrogen base compounds coming within the formula $R_1R_2NH$ include ammonia, methylamine, dimethylamine, ethylamine, diethylamine, propylamine, dipropylamine, isopropylamine, diisopropylamine, butylamine, dibutylamine, sec. butylamine, di sec. butylamine, amylamine, diamylamine, and the like.

The following examples will serve further to illustrate the new compounds of the invention and the manner of preparing the same.

Example 1.—(2-Cyano-3-Dimethylamino)Thiocrotonamide (Method A)

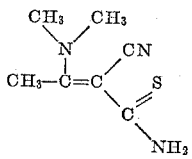

0.75 g. of (2-cyano-3-methoxy)thiocrotonamide was suspended in a mixture of benzene and ethyl ether. Anhydrous dimethyl amine was bubbled into the suspension until most of the solid had dissolved and reprecipitated. The new product, M.P. 152–154 (soft at 150° C.).

Analysis.—Calcd. for $C_7H_{11}N_3S$: C, 49.6; H, 6.55; N, 24.81. Found: C, 49.63; H, 6.24; N, 24.57.

Example 2.—(2-Cyano-3-Dimethylamino)Thiocrotonamide (Method B)

2.0 g. of (2-cyano-3-ethoxy)thiocrotonamide was suspended in benzene. Anhydrous dimethyl amine was bubbled into the suspension until all went into solution. The benzene was evaporated to ½ of its orignal volume, filtered to remove the new solid product which melted at 142–143° C. This material was then recrystallized from methyl alcohol obtaining a product identical with that prepared by Method A above. The mixed melting point of these two materials was not depressed.

Example 3.—(2-Cyano-3-Amino)Thiocrotonamide

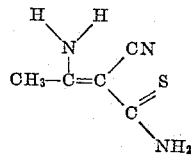

This product was prepared from 2.0 g. (2-cyano-3-ethoxy)thiocrotonamide and excess anhydrous ammonia by the process of Example 2. The product melted at approximately 160° C.

Example 4.—(2-Cyano-3-Amylamino)Thio-2-Heptenamide

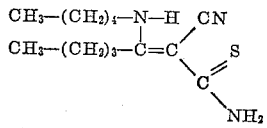

This compound was prepared by suspending 9.9 g. (0.05 mole) of (2-cyano-3-methoxy)thio-2-heptenamide in benzene and adding 4.5 g. (0.052 mole) of n-amylamine. The mixture was stirred at room temperature until a homogeneous solution was obtained. On evaporation of the solvent, the product was obtained as an oily semisolid difficult to purify. Infrared data supported the above structural assignment. The product was used without purification.

*Example 5.—(2-Cyano-3-Diethylamino)Thio-2-Pentenamide*

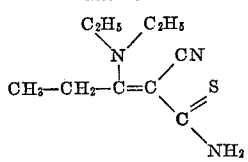

5 g. of (2-cyano-3-ethoxy)thio-2-pentenamide was reacted with anhydrous diethylamine in benzene according to the general procedure of Example 2. The product was a yellow solid which on analysis showed a nitrogen content corresponding to the above structural formula. It melted at 100° C.

*Example 6.—Rodent Repellent Action*

The above materials were tested as rodent repellents according to a food acceptance technique which is described in the following publication: Rodent Repellent Studies I, Development of an Index Number For Expressing Degrees of Repellent Activity, by E. Bellach, J. B. De Witt, J. Am. Pharm. Soc. (Sci. Ed.), 38 (2), 109–112 (1949). An index number greater than 85 is indicative of rodent repellent action and 100 is the highest possible index on the scale used. The index numbers reported here are based on tests where the food contained a 2% concentration of the test material unless otherwise indicated. It should be pointed out that the repellents do not have to be mixed with the food in practical applications. It may be incorporated into or onto the packaging material such as burlap bags, cardboard or even plastic bags. A further practical application is in coating seeds in large scale seeding operations to prevent the seed from being eaten by rodents before they have time to germinate and grow. The following table indicates the activity of the compounds of this invention.

| Compound | Repellent Index |
| --- | --- |
| 1. (2-Cyano-3-dimethylamino)thiocrotonamide (Product from Examples 1 and 2) | 94 |
| 2. (2-Cyano-3-amino)thiocrotonamide (Product from Example 3) | 96 |
| 3. (2-Cyano-3-amylamino)thio-2-heptenamide (Product from Example 4) | 89 |
| 4. (2-Cyano-3-diethylamino)thio-2-pentenamide (Product from Example 5) | 90 |

By proceeding as described in above Examples 1–5 other (2-cyano-3-amino)thio-2-alkenamides coming within the invention can also be prepared. These likewise have generally similar useful properties as rodent repellents and chemical intermediates.

The invention has been described in detail with particular reference to preferred embodiments thereof, but it will be understood that variations and modifications can be effected within the spirit and scope of the invention as described hereinabove and as defined in the appended claims.

What I claim is:

1. A compound represented by the following general formula:

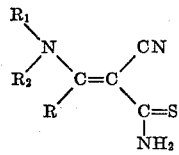

wherein R represents an alkyl group containing from 1–5 carbon atoms and each of $R_1$ and $R_2$ represents a member selected from the group consisting of a hydrogen atom and an alike alkyl group containing from 1–5 carbon atoms.

2. (2-cyano-3-dimethylamino)thiocrotonamide.
3. (2-cyano-3-amino)thiocrotonamide.
4. (2-cyano-3-amylamino)thio-2-heptenamide.
5. (2-cyano-3-diethylamino)thio-2-pentenamide.

6. A process for preparing a compound represented by the following general formula:

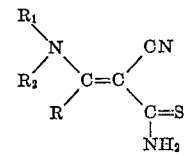

wherein R represents an alkyl group containing from 1–5 carbon atoms and each $R_1$ and $R_2$ represents a member selected from the group consisting of a hydrogen atom and an alike alkyl group containing from 1–5 carbon atoms, which comprises reacting under anhydrous conditions a (2-cyano-3-alkoxy)thio-2-alkenamide having the general formula:

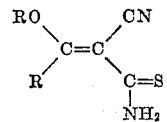

wherein each R is as defined above, with a nitrogen base compound having the general formula:

wherein $R_1$ and $R_2$ are as defined above, in the proportions of 1 mole of the said (2-cyano-3-alkoxy)thio-2-alkenamide to from 1–2 moles of the said nitrogen base compound, at a temperature of from 0°–150° C.

7. A process for preparing (2-cyano-3-dimethylamino)thiocrotonamide which comprises reacting under anhydrous conditions (2-cyano-3-ethoxy)thiocrotonamide with dimethylamine, in the proportions of 1 mole of the said (2-cyano-3-ethoxy)thiocrotonamide to from 1–2 moles of the said dimethylamine, at a temperature of from 0°–150° C.

8. A process for preparing (2-cyano-3-amino)thiocrotonamide which comprises reacting under anyhdrous conditions (2-cyano-3-ethoxy)thiocrotonamide with ammonia, in the proportions of 1 mole of the said 2-cyano-3-ethoxy)thiocrotonamide to from 1–2 moles of the said ammonia, at a temperature of from 0°–150° C.

9. A process for preparing (2-cyano-3-amylamino) thio-2-heptenamide which comprises reacting under anhydrous conditions (2-cyano - 3 - methoxy)thio-2-heptenamide with n-amylamine, in the proportions of 1 mole of the said (2-cyano-3-methoxy)thio-2-heptenamide to from 1–2 moles of the said n-amylamine, at a temperature of from 0°–150° C.

10. A process for preparing (2-cyano-3-diethylamino)-thio-2-pentenamide which comprises reacting under anhydrous conditions (2 - cyano - 3 - ethoxy)thio-2-pentenamide with diethylamine, in the proportions of 1 mole of the said (2-cyano-3-ethoxy)thio-2-pentenamide to from 1–2 moles of the said diethylamine, at a temperature of from 0°–150° C.

References Cited in the file of this patent

UNITED STATES PATENTS 2,733,260    Howard _____ Jan. 31, 1956